July 1, 1930.  F. A. MORAN ET AL  1,768,855
AUTOMATIC SCALE
Filed Jan. 13, 1928  6 Sheets-Sheet 1

Inventor
F. A. Moran
M. Ruckes
By Lacey & Lacey, Attorneys

July 1, 1930.  F. A. MORAN ET AL  1,768,855
AUTOMATIC SCALE
Filed Jan. 13, 1928   6 Sheets-Sheet 5

Inventor
F. A. Moran
M. Ruches

By Lacey & Lacey, Attorneys

July 1, 1930. F. A. MORAN ET AL 1,768,855
AUTOMATIC SCALE
Filed Jan. 13, 1928  6 Sheets-Sheet 6

Inventor
F. A. Moran
M. Ruckes
By Lacey & Lacey, Attorneys

Patented July 1, 1930

1,768,855

UNITED STATES PATENT OFFICE

FRANK A. MORAN AND MICHAEL RUCKES, OF SPRINGFIELD, MASSACHUSETTS, ASSIGNORS TO NATIONAL SCALE CORPORATION, OF CHICOPEE FALLS, MASSACHUSETTS, A CORPORATION OF MASSACHUSETTS

AUTOMATIC SCALE

Application filed January 13, 1928. Serial No. 246,581.

This invention relates to automatic scales and has for its object the provision of an accurate weighing machine which will prevent over-weighing, will not be influenced by weather conditions, and in which the poise will be moved electrically to establish equilibrium in the beam. The invention also includes means for indicating tare weight, and means whereby the weight of the object upon the platform will not be readable until the beam has been locked after equilibrium has been established. The invention also includes a novel dial and means whereby the reading of the dial will be obscured until the dial is at rest and will then be brought into view by the act of locking the scale beam. Other objects of the invention will appear incidentally in the course of the following description, and the invention resides in certain novel features which will be particularly pointed out in the appended claims.

In the accompanying drawings, which illustrate one embodiment of the invention.

In carrying out the invention, there is provided the usual column 1 which rises from a platform resting upon the usual platform lever mechanism and upon the upper end of the column 1 is secured a casing 2 of proper form to enclose the parts constituting our invention. Within the casing 2, we provide brackets, indicated at 3, providing bearings for a steelyard 4 to which the steelyard rod 5 is pivotally attached between the ends thereof. The end of the steelyard remote from the bearing brackets 3 is connected by a suspension link 6 with bearing loops 7 receiving bearings 8 on the sides of an intermediate lever 9 which is fulcrumed at one end in bearings 10 provided within the casing 2 and at its opposite end is connected through a suspension link 11 with bearing eyes or loops 12 receiving bearings 13 on the sides of the beam 14. The beam 14 is fulcrumed between its ends upon bearings 15 provided therefor at the upper end of a standard 16 which is secured in the casing at the center thereof, and rising from the beam is a frame 17 providing bearings for a shaft 18 upon the rear end of which is secured a grooved wheel or pulley 19, as shown. The beam is equipped with adjustable counter-balances 20 secured thereon at opposite sides of the fulcrum thereof so that any uneven or irregular disposition of the weight due to inaccuracies in casting the beam may be counteracted, and at one end of the beam is provided a depending frame 21 having a counterweight 22 mounted upon a screw shaft 23 therein, said screw shaft being accessible to a screw driver or like tool inserted through an opening provided therefor in the end of the casing whereby a very accurate and sensitive setting of the beam may be attained.

Figure 3:
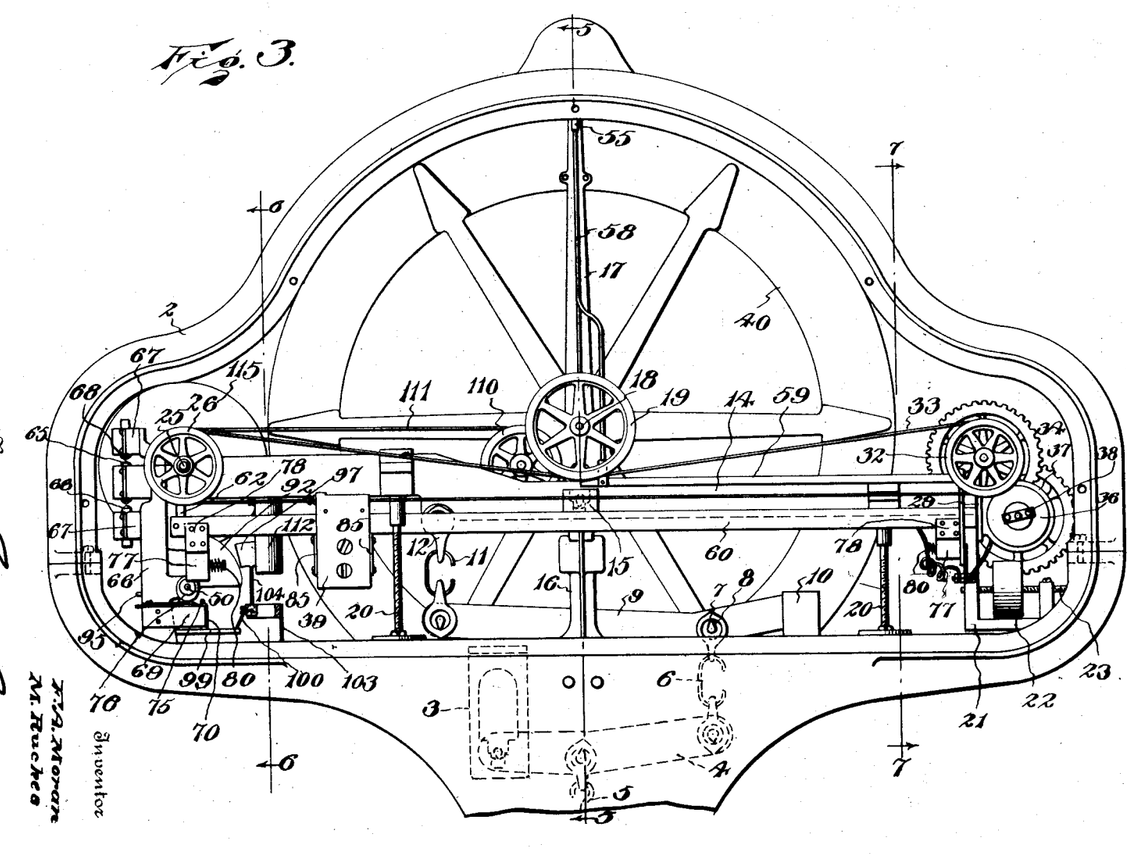
Fig. 3 is a rear elevation with the back plate of the casing removed.
Figure 4:
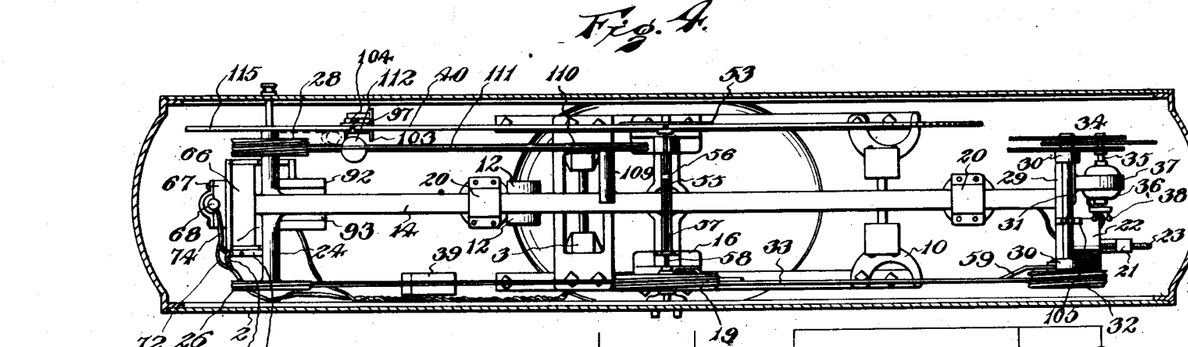
Fig. 4 is a top plan view with the casing in section.

The beam is formed at one end with lateral arms 24 in the end of one of which is secured a stub shaft 25 carrying a grooved pulley 26, and at the end of the other arm is formed or provided a stub shaft 27 carrying a grooved pulley 28. At its opposite end, the beam is formed with a head or bracket 29 defining bearing lugs 30 in which a shaft 31 is mounted, and a grooved pulley 32 is secured upon the back end of the shaft 31, the pulleys 32, 19 and 26 being in alinement and a flexible element, such as a steel cable 33, being trained around the said pulleys, as will be understood upon reference to Figs. 3 and 4. Upon the front end of the shaft 31, we secure members of a speed-reducing and reversing gear, indicated as an entirety by the numeral 34 and actuated from the shaft 35 of an electric motor 36 which is carried by a bracket 37 secured upon the head or bracket 29, as shown in Fig. 4. The motor shaft is equipped with a centrifugal speed governor 38 of well-known form so that the speed of the motor may be rendered smooth and prevented from reaching an excessive rate. As shown most clearly in Fig. 3, the ends of the cable 33 are attached to the opposite sides of a poise 39, and it will thus be evident that, when the motor operates, the poise will be moved in one or the opposite direction longitudinally of the beam and this motion will be transmitted to the shaft 18 upon the front end of which is secured a dial 40.

Figure 1:
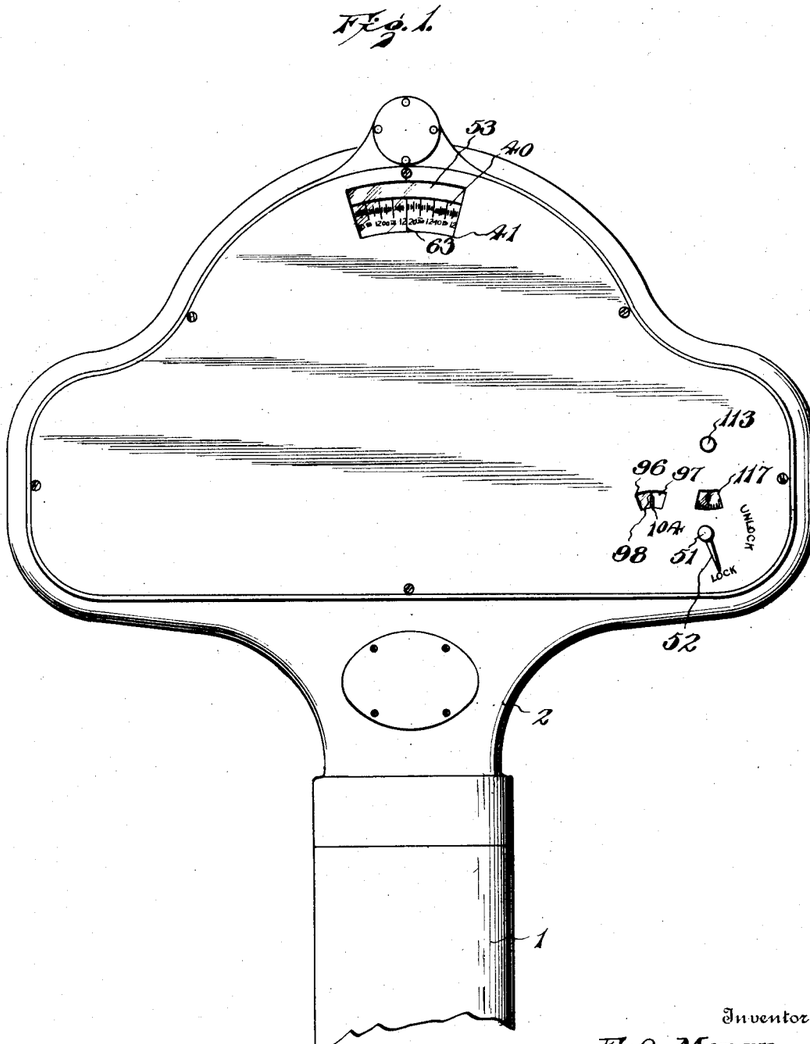
Figure 1 is a front elevation of the upper portion of the scale.
Figure 2:
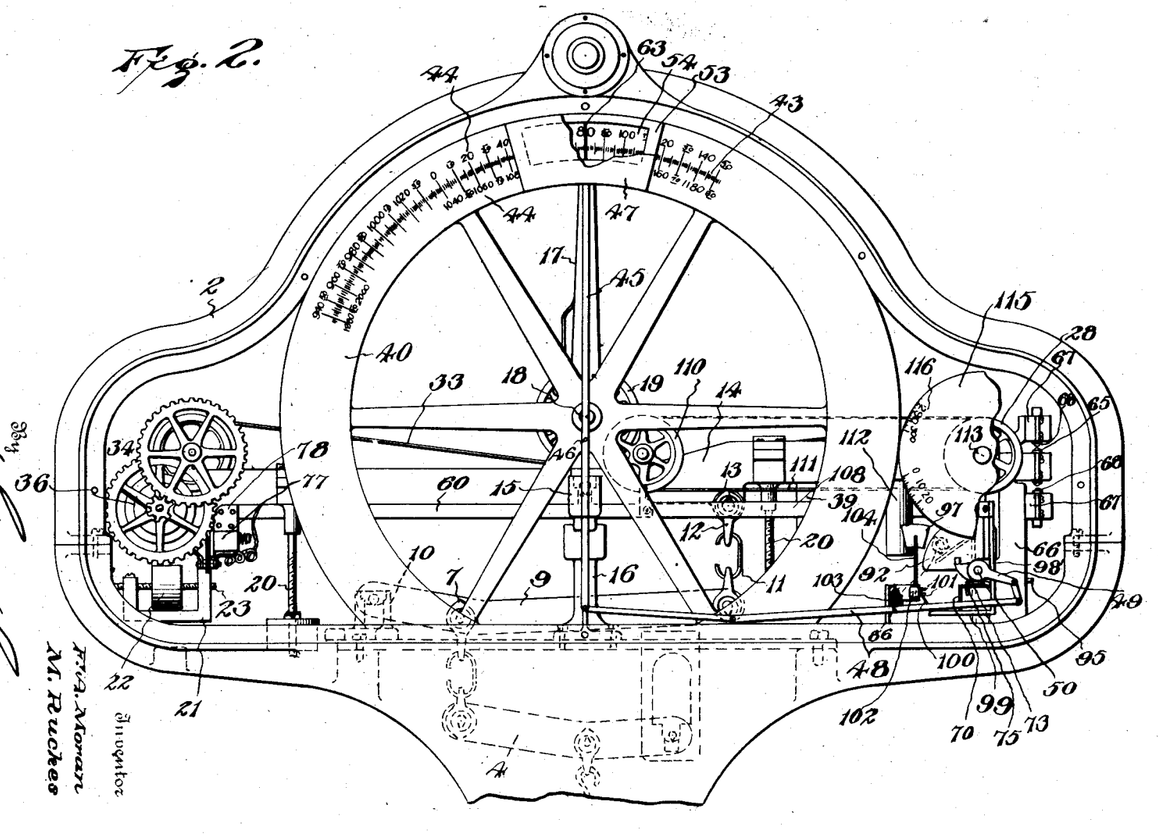
Fig. 2 is a similar view with the face plate removed and the shutter partly broken away.

The dial is arranged close to the front plate of the casing, and in said front plate, at the top thereof, is formed a sight opening 41 through which the upper portion of the dial may be read, the sight opening being preferably glazed, as indicated at 42. As shown in Figs. 1 and 2, the dial has an intermediate zone of graduations 43 upon its rim or marginal portion and at regular intervals some of the graduated marks are extended outwardly and inwardly with respect to the main series of graduations so as to mark off intervals of ten graduations, each graduation representing a pound in weight. The outer and inner zones bear numerals, shown at 44, which progress numerically by ten from the zero point, and it is to be particularly noted that in the outer circle or zone these numerical notations extend from zero to 1,030, while the notations in the inner zone extend from 1,040 at the zero graduation in the outer zone to 2,000, the interval from the 2,000 mark back to the 1,040 mark being left blank. The scale and the dial are calibrated to weigh up to 2,000 pounds, in the illustrated embodiment of the invention, and weights up to 1,040 will be read in the outermost zone while weights between 1,040 and 2,000 will be read in the innermost zone. By providing the blank space following the 2,000 pound notation, any error in the reading of the dial is avoided inasmuch as, immediately after the 2,000 notation passes the hair line, the poise engages the safety circuit-breaker described hereinafter, so that the motor circuit will be broken and the motor will come to rest with the dial in such position that no notations are visible in proximity to the hair line. To further insure accuracy in the reading of the dial, we provide a shutter mechanism which obscures all that portion of the dial back of the sight opening until the weight has been ascertained and the scale beam has been locked, and this shutter mechanism also includes means whereby the outer or the inner zone of the dial will be obscured automatically as the poise passes a certain point of the beam. Referring particularly to Fig. 2, it will be noted that there is a lever 45 disposed between the dial and the front plate of the casing, which lever is pivoted, as at 46, upon the front plate, and at the upper end of this lever is carried an arcuate plate 47 of such dimensions that, when it is located in alinement with the sight opening 41, it will entirely cover said opening and thereby prevent viewing of the dial. Link elements 48 are attached to the lower end of the lever 45 and extend therefrom to a crank arm 49 on the locking shaft 50 which extends through the front plate of the casing and is equipped with a knob or handle 51 from which extends a radial pointer or index finger 52. Upon the outer side of the front face plate of the casing are the legends "Lock" and "Unlock," as shown clearly in Fig. 1, and the pointer 52, in the operation of the apparatus, is caused to point to one or the other of these legends when it is manually set, as will be hereinafter more fully described. Immediately in rear of the shutter 47 is a second shutter or cut-off plate 53 which is of like form and dimensions but is formed with an opening 54 therethrough which is arcuate and concentric with the dial and the dial shaft 18 but is of such radial extent that in one position of the cut-off the outermost zone of the dial will be obscured while in another position the innermost zone of the dial will be obscured and, consequently, only one of said zones may be read in connection with the intermediate zone 43. The inner shutter or cut-off plate 53 is suspended from the front end of a rocking arm 55 which is disposed transversely of the apparatus and is pivoted adjacent its rear end at the upper end of the frame or standard 17, the intermediate portion of the arm being passed through and guided by an eye 56 at the upper end of a bracket 57 secured to the standard 17 and extending forwardly and upwardly therefrom, as shown most clearly in Fig. 5. To the rear end of the rocking arm 55 is pivoted the the upper end of a link 58 which has its lower end pivoted to the end of a lifter 59 which extends longitudinally of the machine to the bracket 29 and is pivoted thereto, said lifter being disposed to be actuated by the poise 39 which is slidably mounted on a track 60 disposed at the back of the beam and secured at one end to the bracket or head 29 and at its opposite end to a lower lateral arm 61 of the beam, the arm 61 being connected with the lateral arm 24 through an intermediate web 62, as shown clearly in Fig. 6. From the foregoing, it will be understood that the track 60 is in the same vertical plane with the cable 33 and the pulleys about which it is trained, and the lifter 59 of the shutter mechanism extends from the vertical plane of the dial shaft 18 toward the end of the beam upon which the motor is mounted. As with all beam scales, when a weight is placed upon the platform, the scale beam is rocked and the poise is moved longitudinally of the beam until it reaches the point where it establishes equilibrium in the beam.

In the normal position, that is with the beam unlocked and no weight on the platform, the beam will be in equilibrium and the poise will be at the contact end of the beam. When a weight is placed upon the platform, the contact end of the beam is rocked downwardly and the poise moves toward the motor until a position of equilibrium is reached. When the weight is removed from the platform, the beam rocks upwardly to close the motor circuit through the upper contacts and the poise is moved away from the motor. Should the weight be less than 1,040 pounds, the cut-off plate 53 remains in its upper position whereby its lower margin obscures the inner zone of the dial, permitting the outer zone to be read when the beam has been locked. Should the weight be 1,040 pounds, or more, the poise will ride under the lifter 59 and raise the same so that the arm 55 will rock and lower the plate 53 whereby the upper marginal portion of the plate will cover the outer zone of the dial, permitting the inner zone to be read. A hair line, indicated at 63, is preferably secured across the opening 54 at the center of the same so as to accurately mark the reading of the dial which is to be noted.

Figure 5:
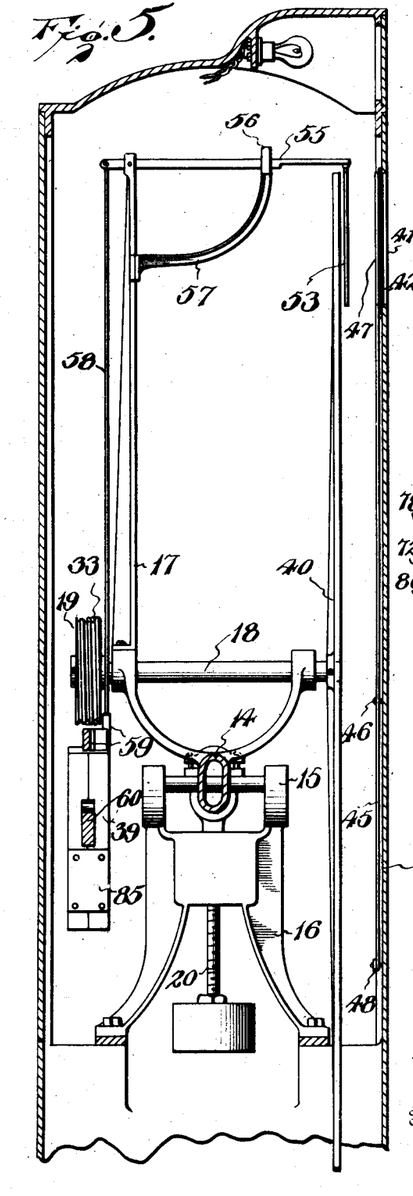
Fig. 5 is a central transverse section on the line 5—5 of Fig. 3.
Figure 6:
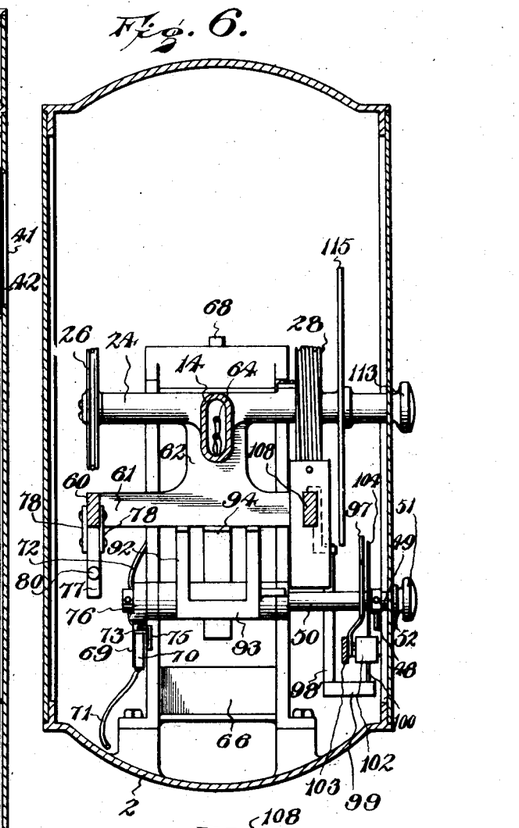
Fig. 6 is a transverse section on the line 6—6 of Fig. 3.
Figure 7:
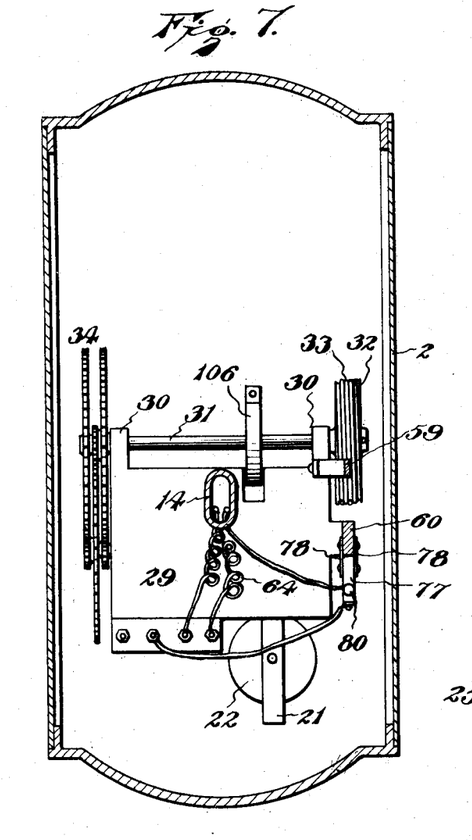
Fig. 7 is a transverse section on the line 7—7 of Fig. 3.
Figure 8:
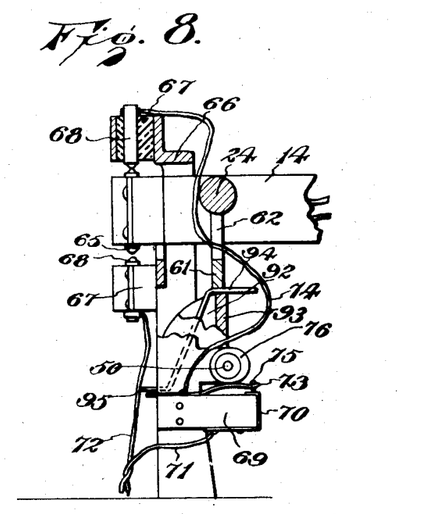
Fig. 8 is a longitudinal sectional elevation showing the end of the scale beam and the circuit closers cooperating therewith.
Figure 9:
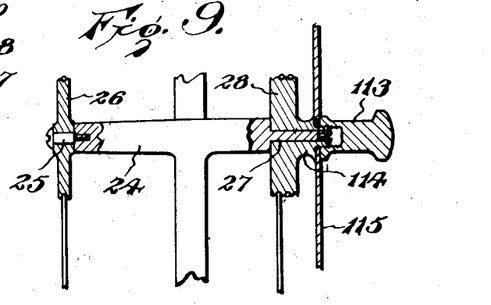
Fig. 9 is an enlarged horizontal section of the tare-indicating dial and the means for actuating the same.

The motor is, of course, reversible and the direction in which its shaft will be driven is determined by the action of the beam through mechanism which is indicated most clearly in Fig. 8. The beam is hollow, as shown in Figs. 5, 6 and 7, and electric conductors 64 are carried through the beam and insulated therefrom, these conductors being suitably connected at one end with the motor and at the opposite end with a conductor element 65 which is secured in or to the end of the beam remote from the motor and insulated therefrom, the ends of said conductor element being projected from the top and bottom of the beam, as shown clearly in Fig. 8, to form contact points. In the end of the casing is secured a frame or standard 66 which is in skeleton form to permit the passage of the end of the beam, and to this standard or frame above and below the end of the beam are secured blocks of insulation 67 through which are fitted contact points 68 arranged to be engaged by the contact 65 of the beam when the latter rocks. Upon one side of the frame or standard 66 is secured a block of insulation 69 around the inner end of which is secured a metal plate 70 to which is attached one end of a conductor 71, a conductor 72 being carried along with the conductor 71 and attached to the lower end of the lower contact 68, as clearly shown in Fig. 8. The end of the plate 70 is turned over the upper side or edge of the insulation block 69 and, spaced from the end of the plate 70, a leaf spring 73 is secured upon the upper edge of the block, a conductor 74 being secured at one end to the spring and at its opposite end to the upper contact 68. The spring 73 is adapted to make electric contact with the end of the plate 70 and tends to move therefrom under its own resiliency, a keeper 75 being attached to the block 69 and extending over the free end of the spring to limit the upward movement of the same and prevent it assuming an inoperative position. The end of the lock shaft 50 is disposed immediately above the leaf spring 73 and carries a cam 76 which is adapted to bear upon the spring and hold it against the end of the plate 70 while the scale is in operation, the shaft being journaled in bearings provided therefor upon the frame 66, as will be understood. It will now be understood that, if the beam swings upwardly, contact will be made between the contact point 65 on the beam and the upper contact 68 and a circuit will be closed through the motor so that the motor will operate to draw the poise in a direction away from the motor while, if the beam is swung downwardly, the circuit will be closed through the lower end of the contact 65 and the lower contact 68 and the poise will be moved in the opposite direction. While the motor is operating, the end of the spring 73 is held to the end of the plate 70, the lock shaft 50 being so turned that the index or pointer 52 will be directed toward the legend "Unlock" and the cam 76 will be exerting pressure upon the spring 73. When the scale has reached such adjustment that the weight of the object is ascertained, the lock shaft is given a quarter of a turn and the cam 76 then brought into such position that the spring 73 will be freed and the motor circuit broken, this action of the lock shaft also lifting the end of the scale beam and locking it in raised position as will be presently described, and simultaneously shifting the crank 49 and its connections so that the lever 45 will be rocked laterally and the shutter 47 moved from behind the view opening 41.

Figure 10:
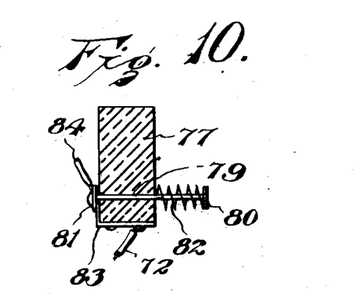
Fig. 10 is an enlarged detail section of the safety circuit breaker.

It is desirable to provide means whereby any tendency of the poise to move beyond either end of the scale beam will effect a stoppage of the motor, and to this end we provide circuit breakers at each end of the beam which are adapted to be operated by the poise. These circuit breakers each comprises a block 77 of insulation secured to the track 60 by straps or hanger plates 78 and a conducting rod 79 slidably fitted through the block 77 parallel with and longitudinally of the track. The rod or slidable contact 79 is provided with heads 80 and 81 at its opposite ends, as shown in Fig. 10, and between the head 80 and the block 77 an expansion spring 82 is coiled around the rod so that the head 81 will be held against a conductor plate 83 secured to the lower edge and outer side of the block 77. Conductors 72 and 84 attached to the plate 83 and the head 81, respectively, connect these elements into the motor circuit in such manner that if the head 81 be moved from the plate 83 the motor circuit will be broken and the motor stopped. The just-described circuit breakers are, as stated, arranged in the path of the poise 39 and the latter is equipped with plates 85 of insulation upon its opposite edges whereby it may impinge against the heads 80 of the respective circuit breakers and overcome the springs 82 without causing any short circuits which would interfere with the successful use of the machine.

Figure 12:
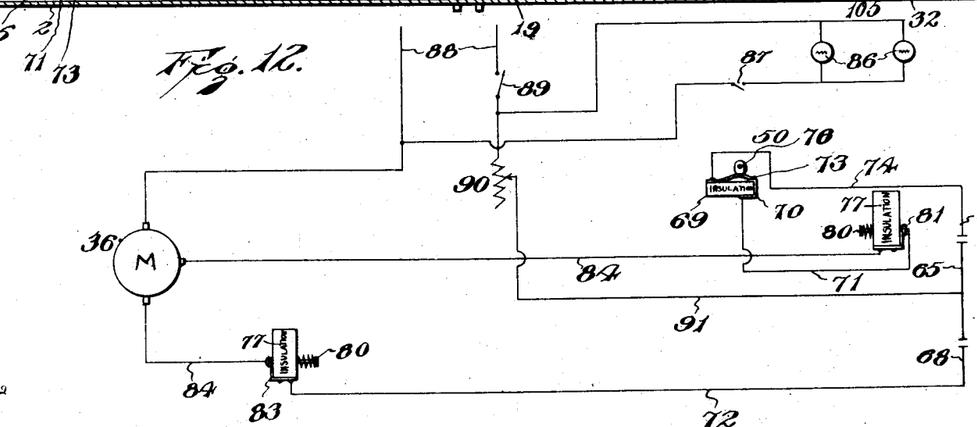
Fig. 12 is a diagram showing the electric circuits.
Figure 13:
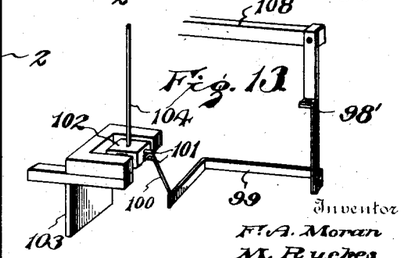
Fig. 13 is a detail of the trembler.

The electric circuits of the apparatus are illustrated in diagram in Fig. 12 to which reference will now be made, and it may be noted that we provide electric lamps within the casing, one of said lamps being located at the top thereof so that when the scale is used the dial may be illuminated and easily read while another lamp is arranged adjacent the tare dial to illuminate the same, the tare dial being hereinafter specifically described. In the diagram in Fig. 12, the lamps are indicated at 86, and in actual practice a switch is mounted upon the casing in a convenient place so that the lamps may be energized or de-energized at will, the switch being indicated diagrammatically at 87. The current is brought into the apparatus over trunk lines 88 in either one of which may be mounted a switch 89, as will be understood. From the switch, the current passes to a rheostat 90 which may be located at the back of the column of the machine and is utilized to regulate the machine according to the prevailing normal temperatures and weather conditions. It is common practice at this time to provide dashpots containing a liquid, such as oil, in order to obviate excessive oscillation in the scale beam, but these dashpots are sensitive to moisture and to temperature and need frequent adjustment. By employing a rheostat which may be set to interpose more or less resistance in the operating circuit of the machine, we overcome the objections to the dashpot and other instrumentalities now employed and obtain a mechanism which will operate with certainty at all times. From the rheostat, a conductor 91 extends through the scale beam to the contact member 65, the upper contact 68 which cooperates with the contact 65 being connected, as previously stated, through a conductor 74 with the spring 73 while the plate 70, cooperating with said spring, is connected by the conductor 71 with the head 81 of the adjacent circuit breaker, the opposite member of the circuit breaker being connected by the conductor 84 with the motor. One of the trunk lines 88 is, of course, directly connected with the motor and at the opposite side of the motor the adjacent circuit breaker 77 is connected therewith by a conductor 84, the latter circuit breaker being connected through the conductor 72 with the lower contact 68. Now assuming, for instance, that the end of the scale beam has been rocked upwardly, the circuit will be closed through the contact 65 and the upper contact 68 to the spring 73 and then through the plate 70 to the adjacent circuit breaker 77. From the circuit breaker, the current flows to the motor and thence out through the trunk line. Should the poise move an excessive distance, it will impinge against the head 80 in the circuit breaker and separate the head 81 thereof from the contact plate 83, whereupon the circuit will be obviously broken and the motor will come to rest. When the scale beam has reached a point of equilibrium, the lock shaft is rocked so that the beam will be held against movement and the spring 73 at once freed from the contact plate 70 so that the motor circuit will be broken, and it may be here noted that this lock shaft is operated to lock the beam against movement and break the motor circuit whether the beam be moved downwardly or upwardly and the circuit closed through the lower contact 68 or the upper contact 68. The beam is locked by being rocked upwardly, and this upward rocking, of course, immediately separates the contact 65 from the lower contact 68.

To lock the scale beam against movement, the locking shaft 50 is equipped with a quadrantal bracket or locking cam 92 which is adapted to bear against the lower edge of the extension web 62 on the end of the beam and when in such position, which is shown in Fig. 8, the beam will be obviously held against downward movement. If the lock shaft be turned so that the back plate 93 of this cam bracket is disposed in a lowered position extending inwardly from the lock shaft, as shown in Figs. 2, 3 and 4, the beam will be free to oscillate, and in order that there may be certainty of engagement between the cam and the beam in its locking position, the beam is equipped with a stop bracket or arm 94 which projects inwardly therefrom over the cam bracket 92, as shown most clearly in Fig. 8. This stop arm 94 extends downwardly and outwardly and has its lower end 95 playing in a slot provided therefor in the frame 66 so that excessive vibration of the beam cannot occur at any time.

Figure 11:
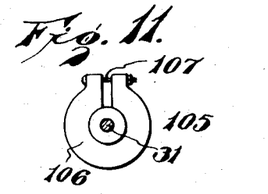
Fig. 11 is a detail section showing the means for eliminating vibration.

As has been previously described, when the scale beam is seeking a position of equilibrium, the shutter 47 covers the sight opening 41 so that the dial of the scale cannot be read. Means are provided, however, whereby the operator may determine when a point of equilibrium has been reached and will be advised that the lock shaft should be turned. For this purpose, a view opening 96 is provided in the face plate of the casing adjacent the knob 51 on the lock shaft and back of this opening a blind or screen 97 may be supported in any convenient manner, a central hair line, indicated at 98, being formed on this screen, as will be understood. Secured to and depending from the adjacent end of the scale beam is a bracket or arm 98' which has its lower end extended inwardly longitudinally of the casing, as indicated at 99, and to the free end of this inwardly extending portion is secured an upstanding finger 100 having its end turned laterally to engage between pins or studs 101 on a block 102 which is pivotally supported on a bracket 103 secured in the casing. Rising from the block 102 is a trembler finger or indicator 104 which plays across the blind 97 in consonance with the movement of the scale beam. When the position of this indicator or trembler coincides with the hair line 98 on the blind 97, the operator is informed that the lock shaft should be turned to lock the scale beam and the dial will then be held firmly in the position to which it has been brought so that it may be accurately read. In order that the scale beam may be brought to rest without the trembling which is now so noticeable in most weighing machines as the poise reaches the point of equilibrium, we provide a brake 105 shown in Fig. 11, which consists of a split collar 106 of insulation fitted upon the shaft 31 and held firmly upon the shaft by a clamp screw 107 inserted through mating lugs at the split of the collar whereby it will be held in frictional engagement with the shaft. Turning of the collar with the shaft will be prevented by the engagement of the clamping screw and the lugs or ears through which it is inserted with an adjacent portion of the head or bracket 29 if, perchance, the collar should for awhile move with the shaft.

Secured to the front side of the scale beam 14 is a tare beam 108 which extends from the contact-carrying end of the beam to a point near the center thereof where it is connected with the beam by a transverse arm 109. The arm 109 provides a bearing for a grooved pulley 110 which is alined with the pulley 28, and a cable 111 is trained about the pulleys 28 and 110, as shown. Attached to the cable 111 is the tare poise 112 slidably mounted upon the tare beam 108, and it will be seen at once that this tare poise may be moved along the tare beam by rotation of the pulley 28. To rotate the pulley 28, a handle or turning knob 113 is provided having threaded engagement with the hub 114 of the pulley whereby it may impart rotation to the pulley and also clamp the tare dial 115 against the end of the hub so that said dial will be rotated with the pulley and move in consonance with the tare poise. The dial 115 has graduations, indicated at 116, marked about its periphery, and these graduations may be read through a sight opening 117 in the face plate of the casing located immediately over the lock shaft. Normally, of course, the poise 112 will be at such point of the tare beam that the tare dial 115 will indicate zero and when a tare weight is to be ascertained, the knob 113 is rotated manually until the vibration of the beam ceases which will be indicated by the pointer or index 104 coming to rest upon the hair line 98, it being remembered that the tare beam is fixed to the scale beam and the pointer 104 is actuated by an operative connection with the scale beam.

In actual use, the machine is equipped with a printing mechanism operatively connected with the respective dials whereby the tare and total weights will be registered and a printed record of the same may be furnished. We have not illustrated this mechanism in the present application, however, inasmuch as it constitutes a separate invention and will be made the subject-matter of another application.

Having thus described the invention, we claim:

1. A weighing mechanism including a rotary dial having concentric rows of graduations, a load-balancing element, means for rotating the dial in consonance with the movement of said element, a shutter having a window providing a common reading point for said graduations on the dial, and means actuated by the load-balancing element for shifting the shutter when the dial has made one revolution to cause the shutter to move into registration with a portion of one row of graduations and out of registration with a portion of the other row of graduations.

2. A weighing mechanism including a rotary dial having concentric rows of graduations, and a series of sub-graduations therebetween, of a shutter movable over the dial to conceal a portion of either row and to disclose a portion of the other row and the sub-graduations in the zone of the shutter, a second shutter normally obscuring the first-mentioned shutter and portions of all the rows of graduations, and means for actuating the second shutter to permit reading of the dial when the dial has assumed a position of rest.

3. A weighing mechanism including a rotary dial having concentric rows of graduations, and a series of sub-graduations therebetween, a shutter movable over the dial to conceal a portion of one row and to disclose a portion of the other row and the sub-graduations in the zone of the shutter, a scale beam, a poise movable longitudinally of the scale beam, means whereby the dial will be rotated in consonance with the movement of the poise, and means whereby the poise will operate the shutter.

4. A weighing mechanism including a rotary dial having concentric rows of graduations, and a series of sub-graduations therebetween, of a shutter movable over the dial to conceal a portion of one row and to disclose a portion of the other row and the sub-graduations in the zone of the shutter, a scale beam, a poise movable longitudinally of the beam, means for rotating the dial in consonance with the movement of the poise, a lifter pivotally carried by the beam and adapted to be rocked by the poise, and operative connections between said lifter and the shutter whereby to shift the shutter.

5. A weighing mechanism including a rotary dial having concentric rows of graduations, and a series of sub-graduations therebetween, a scale beam, a poise movable longitudinally of the scale beam, means for rotating the dial in consonance with the movements of the poise, a frame rising from the scale beam, a rocking arm mounted on said frame, a shutter suspended from said arm in advance of the dial and constructed to conceal a portion of one row of graduations thereon and to disclose a portion of the other row and the sub-graduations in the zone of the shutter, a lifter pivotally supported adjacent the scale beam in the path of the poise to be actuated by the latter, and link connections between the lifter and the rocking arm.

6. A weighing mechanism comprising a casing having a view opening therein, a rotary dial within the casing and having its marginal portion provided with rows of graduations movable across said view opening, a scale beam, a poise on the scale beam, means for rotating the dial in consonance with the movements of the poise, means for locking the scale beam in a position of equilibrium, a shutter normally obscuring the dial and covering the view opening in the casing, and means whereby when the scale beam is locked the shutter will be shifted from the view opening to permit the dial to be read.

7. A weighing mechanism including a casing having a view opening therein, a rotary dial within the casing having marginal graduations to be read through said view opening, a scale beam, a poise on the beam, means for rotating the dial in consonance with the movements of the poise, means for locking the scale beam, a lever pivotally mounted upon the casing, a shutter carried by the upper end of the lever and normally covering the view opening, and connections between said lever and the means for locking the scale beam whereby when the scale beam is locked the shutter will be moved from across the view opening.

8. A weighing mechanism including a rotary dial, a scale beam, a dial shaft carried by the scale beam at the center thereof and to which the dial is secured, a poise movable longitudinally of the scale beam, pulleys mounted at the ends of the scale beam, a pulley on the dial shaft, a cable trained about said several pulleys and permanently attached at its ends to the poise whereby to rotate the dial in consonance with the movement of the poise, a motor at one end of the beam geared to the pulley at said end of the beam, the poise being normally at the opposite end of the beam, means at the last-mentioned end of the beam for reversing the motor, and means at said end of the beam for locking the beam to permit reading of the dial.

9. A weighing mechanism including a scale beam, a rotary dial carried by the beam, a poise movable longitudinally of the beam, connections between the poise and the dial whereby the dial will be rotated in consonance with the movements of the poise, an electric motor for moving the poise, stationary contacts disposed respectively above and below one end of the scale beam, a contact carried by the scale beam and engageable with either of said stationary contacts, means for establishing an electric circuit through the contacts and the motor, and circuit breakers at the ends of the scale beam included in the electric circuits and each comprising a stationary contact and a sliding contact yieldably held against the stationary contact and arranged in the path of the poise to be operated thereby and break the circuit.

10. A weighing mechanism including a scale beam, a poise movable longitudinally of the beam, fixed electric contacts arranged above and below one end of the beam, a contact element carried by the end of the beam and adapted to engage either of the fixed contacts, an electric motor for moving the poise, circuits including the motor and the several contacts whereby the motor will be energized upon engagement of the contact on the beam with either of the fixed contacts, a normally closed circuit breaker in circuit with the upper fixed contact, a rocking member arranged below the end of the scale beam and adapted to support the beam in a raised position and lock it against movement, and a cam movable with said rocking member and engaged with said circuit breaker whereby when said rocking member is free of the beam the circuit breaker will be closed and when the rocking member is supporting the beam the circuit breaker will be opened.

11. A weighing mechanism including a scale beam, a rotary dial, a shaft carrying said dial and disposed above and supported by the scale beam, a track disposed below and at the rear of the beam, a poise mounted on said track and slidable along the same, pulleys mounted at the ends of the beam, a pulley on the dial shaft, a cable trained around said pulleys and attached to the poise, means including circuit-closing elements at one end of the beam for electrically moving the poise, and circuit-breakers at the ends of the track in the path of the poise to be engaged by the poise and break the circuit to stop the movement of the poise.

12. A weighing mechanism including a casing, a scale beam mounted within the casing, a poise on the beam, a rotary dial operable in consonance with the poise and having graduations viewable through an opening in the casing, a shutter normally obscuring the dial, means for locking the beam and simultaneously shifting the shutter to expose the dial, a trembler arranged adjacent a second opening in the casing, and connections between the trembler and the scale beam whereby the trembler will indicate the movement of the dial.

13. A weighing mechanism including a casing having view openings in its front side, a scale beam within the casing, a poise thereon, a rotary dial operating in consonance with the poise and having marginal graduations readable through one of the openings in the casing, a shutter normally covering said opening, a trembler finger pivotally mounted within the casing and extending across the other opening therein, a bracket secured to the scale beam, a slidable pivotal connection between said bracket and the trembler whereby the trembler will indicate the movements of the beam, and means for locking the beam and shifting the shutter.

In testimony whereof we affix our signatures.

FRANK A. MORAN. [L. S.]
MICHAEL RUCKES. [L. S.]